…

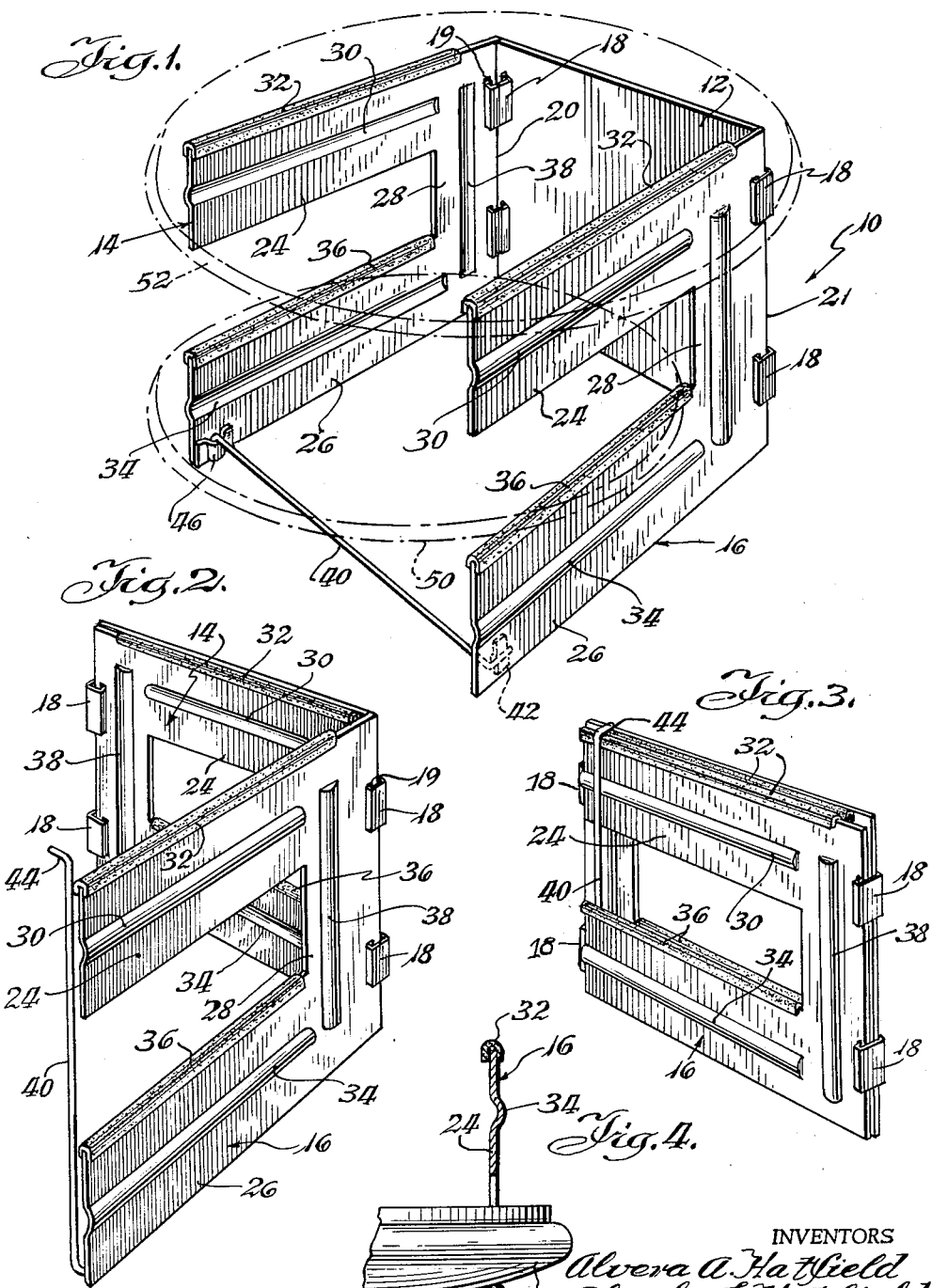

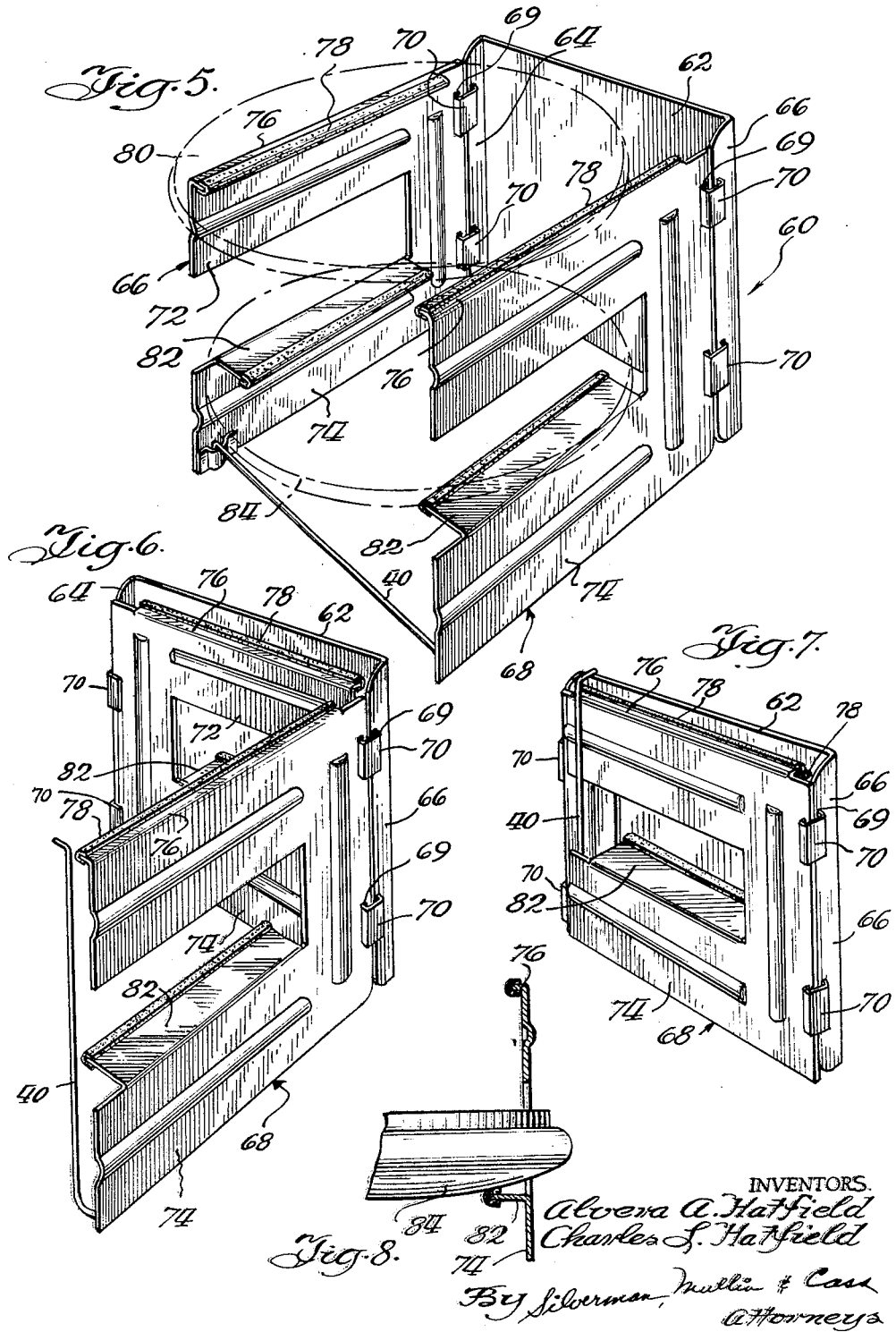

United States Patent Office 3,141,553
Patented July 21, 1964

3,141,553
COLLAPSIBLE POT COVER HOLDER
Alvera A. Hatfield and Charles L. Hatfield, both of 14832 Champlain Ave., Dolton, Ill.
Filed Jan. 24, 1962, Ser. No. 168,430
5 Claims. (Cl. 211—41)

This invention relates generally to support structures for pot covers, and more particularly is concerned with a portable or collapsible rack for such pot covers.

While there is no question that there have been substantial advances in the appliances and apparatus used in the modern kitchen, and that thereby a considerable portion of the inconvenience and drudgery of housework has been obviated, nevertheless there are certain problems which have not as yet been solved. Among these problems is one which seems unimportant until one considers that it exists wherever cooking is done.

Reference is had to the problem of storing the covers of cooking utensils such as pots, fry pans, casseroles and the like either during or immediately following cooking or baking. Such covers collectively will be referred to hereinafter as pot covers, although the invention is not limited to the cover for any specific type of cooking vessel.

In the cooking, baking or frying process, many utensils and containers are covered. These covers may be engaged upon the respective vessel with varying degrees of engagement, both tight and loose, practically all covers are provided with central handles or knobs to enable manipulation thereof, and in the cooking process these covers will be removed while quite hot. Condensation usually accumulates on the interior surfaces of the cover and often other matter such as grease and the like will also be present, usually in liquid form. In order to avoid dripping or run-off of liquid, it is necessary that the user hold the cover inverted or set the cover down inverted at a location convenient to the range, either to let the cover cool, or to remove some of the food from the vessel and for various other reasons. The presence of the handle or knob renders placement of the cover awkward on the usual surfaces available, such as for example, a portion of the cooking range or some other adjacent work surface. Likewise, these covers will roll, the condensation or other materials may run off, the heat may damage certain work surfaces, and in general, the space occupied is at a location where space is at a premium. Furthermore, the covers are not readily accessible by the user.

The primary object of the invention is to solve all of these difficulties in the provision of a portable or collapsible storage rack for covers which will alleviate the problems heretofore experienced in connection with pot covers.

A further object of the invention is to provide a simple and yet economical storage rack which may be located on the cooking range or upon any other work surface immediately adjacent the cooking area at a convenient location and readily available to the user, but which may be collapsed to a very small assembly to enable storage of the rack out of sight.

Still a further object of the invention is to provide a collapsible pot cover storage rack of the character described which will hold a plurality of pot covers in inverted condition readily available and without scratching or marring of polished surfaces thereof and which will enable such covers to be disposed where the circulating air can at least partially dry them.

A still further object of the invention is to provide a pot cover storage rack of the character described in which novel means are provided for enabling the collapse of the device; novel means are provided for supporting the pot covers; novel means are provided for locking the rack in its open condition and means are provided for convenient access to the handle of the cover.

With the foregoing and other objects in view which will appear as the description proceeds, the invention consists of certain novel features of the construction, arrangement and a combination of parts hereinafter fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

Referring to the drawing in which the same characters of reference are employed to indicate corresponding or similar parts throughout the several figures of the drawing:

FIG. 1 is a perspective view of the pot cover rack holder constructed in accordance with the invention, two pot covers being illustrated in broken lines supported upon the rack.

FIG. 2 is a similar perspective view of the rack or holder of FIG. 1, the same being shown in partially collapsed condition.

FIG. 3 is a perspective view showing the rack of FIG. 1 fully collapsed.

FIG. 4 is a fragmentary sectional view taken through one side wall of the rack showing the manner in which a pot cover is supported thereon.

FIG. 5 is a perspective view similar to that of FIG. 1 but illustrating a modified form of the invention.

FIG. 6 is a perspective view similar to that of FIG. 2 but of the modified form of the invention of FIG. 5.

FIG. 7 is a perspective view similar to that of FIG 3 but of the modified form of the invention shown in FIG. 5.

FIG. 8 is a view similar to that of FIG. 4 but also of the modified form of the invention.

Generally the invention is characterized by the provision of a generally rectangular support plate having support arms hingedly secured on opposite vertical edges thereof, the said arms being respectively swingable between positions overlying and hence collapsed upon the said vertical support plate and positions arranged normal to the vertical support plate; however, the arms in the latter position may cooperate to support pot covers placed thereupon.

The invention is further characterized by a latching device for locking the arms in pot cover supporting position.

Referring now to the drawings, there are two forms of the invention illustrated respectively in FIGS. 1 through 4 and FIGS. 5 through 8. The form of the invention illustrated in FIGS. 1 through 4 is of simpler structure but its use is limited to pot covers of a size greater than those that can be supported mounted upon the device shown in FIGS. 5 through 8.

The first form of the invention is designated generally by the reference character 10 and, as seen, there provided a vertical rectangular plate 12 which may be a simple sheet of aluminum or other light metal having the pot cover support bracket members 14 and 16 hingedly secured along the vertical edges thereof. These bracket members 14 and 16 are likewise formed of light metal such as aluminum or the like and the hinged engagement is provided by a relatively simple arrangement in which juxtaposed vertical slots 19 are punched in the contiguous edges of the vertical plate 12 and the respective bracket members 14 and 16 and small strips of metal are inserted and clamped together in tubular form as shown at 18. The hinged axes are defined by the juncture of the respective parts at 20 and 21. The hinged connection afforded by the tubular hinges 18 is fairly loose since the slots 19 which are not shown must be of sufficient size to enable the manipulation of the metal strips forming the hinges 18.

Obviously, other forms of hinged connection may be used although the ones that have been described are fairly economical.

Each of the bracket members 14 and 16 is in the configuration of a U lying on its side, thereby providing arms such as shown at 24 and 26, and a vertically arranged bridging part at 28. The construction of the bracket members 14 and 16 is the same and hence there is no need to detail both.

The arms 24 are each provided with elongated strengthening ribs 30 upset in the said arms and preferably provided along their upper edges with a protective cap 32 of plastic, rubber or the like. The arms 26 are also ribbed as at 34 and provided with the relatively resilient cap 36. A vertical rib 38 in the bridging portion 28 strengthens that part of the bracket members 14 and 16. A wire bail member 40 is hingedly secured to one of the bracket members such as 16 by any suitable means such as shown at 42 to enable the same to swing vertically to the position of the wire member which is illustrated in FIG. 2. At its opposite end, the member 40 is provided with a hook 44 that engages in a suitable socket 46 secured to the arm 26 of the bracket member 14. It will be seen that when the wire member or bail as it may be termed is in place, a box-like structure as illustrated in FIG. 1 is formed providing two ledges on opposite sides for the support of the pot covers shown in broken lines at 50 and 52.

The simplicity of the apparatus is obvious and it will be seen that the covers are supported preferably with their concave sides up to prevent the draining of the condensate or other material. This is best shown in FIG. 4.

When it is desired to collapse the apparatus 10 and store the same, first the hook 44 of the bail 40 is removed from socket 46 and the bail is swung to a vertical position such as shown in FIG. 2. Thereafter, the bracket member 14 is rotated into face to face engagement with the inner surface of the vertical plate support member 12 as shown in FIG. 2. Thereafter, the second bracket member 16 is in turn rotated to lie upon the outside of the bracket member 14 so that the resulting assembly as shown in FIG. 3 is composed of the three thicknesses provided by the three parts. The bail 40 is fairly resilient and may be moved to any convenient location such as shown in FIG. 3 on the exterior of the arm 24 of the bracket member 16. In this condition, it will be obvious that the device occupies very little space and is readily stored out of sight.

The modified form of the invention differs from that described in several aspects. Thus the modified form is designated by the reference character 60 and the same is formed of a vertical support plate 62, having a generally channel formation because of the flanges 64 and 66 formed along the vertical edges thereof. As in the case of the embodiment previously described, there are bracket members 66 and 68 provided which are hingedly secured to the vertical support plate 62 by means of the tubular hinges 70 which are substantially identical in construction to the tubular hinges 18. The slots 69 for accommodating the hinges 70 are formed in the flanges 64 and 66 instead of in the body of the plate 62 while the necessary aligned slots for accommodating the hinges 70 are formed in the bracket member 66 and 68.

Each of the bracket members is provided with arms 72 and 74 which are quite similar in construction to the arms 24 and 26 with the exception of their upper edges. The upper edge of the arms 72 are each inwardly bent as shown to form flanges 76 and these flanges in turn are covered with resilient edge members 78 whose function is the same as the cap members 32. By turning the upper edges of the arms inwardly the device 60 will thereby support pot covers 80 of both large and small diameters, whereas the structure of the device 10 is such that the minimum diameter of pot cover which may be supported is somewhat limited by the distance between the arms 14.

The upper edges of the arms 74 are likewise turned inwardly as at 82, a substantial distance greater than the flanges 76 so that the resulting structure will support even smaller pot covers such as 84. This is best illustrated in FIG. 8.

In all other respects, the construction and operation of the device 60 is similar to that of the device 10. Because of the flanges 82, the thickness of the resulting assembly after collapse as shown in FIG. 7 is greater than that in FIG. 3. This also requires the vertical flanges 64 and 66 to provide sufficent space for forming a compact collapsed package.

In locating the ledges for supporting the covers sufficient space is provided for inserting the hand of the user between the surface on which the device is supported and the lower cover 50, in FIG. 1 for instance, and between the two covers 50 and 52 for reaching and holding the handle of the cover. Thus, either cover can be removed and especially the top cover 52 without contacting the lower cover. Since the covers are inverted, their polished surfaces will never be scratched or marred by the device.

A further advantage deriving from the invention is that the covers can be temporarily stored while cooking is in progress and retrieved by the cook without sustaining burned fingers, for instance. Where such heated covers merely are placed inverted on a support surface, it is most difficult, if not impossible with some types of covers, to insert the fingers below the body of the cover so as to grip the handle without contacting the hot cover with resulting burns. The rack embodying the invention permits the heated covers to be supoprted inverted in a raised position so that access to the handle of the cover is readily available without risk of touching the hot cover. It is believed that the invention as been fully described so as to enable those skilled in this art to understand the construction and operation thereof and it is desired to indicate that variations in the minor details are capable of being made without in any way departing from the spirit and the scope of the invention as defined in the appended claims.

What it is desired to secured by Letters Patent of the United States is:

1. A collapsible and portable rack for supporting inverted pot covers which comprises a plate member adapted to be arranged in vertical position adjacent a cooking area, a pair of bracket members of generally U-shaped configuration and each having a pair of elongate arms and a bridging portion, the bridging portions being arranged vertically and hingdely conjoined respectively along vertical opposite edges of the support member, a removable bail connected between the bracket members whereby to enable the said bracket members to be erected in spaced condition for the support of the inverted pot covers thereon, the removal of the bail enabling the bracket members to be interfolded upon the plate member to provide a small package for storage of the said device, said plate member and arms cooperable for supporting said rack on a horizontal support surface in said erected condition of the rack.

2. A structure as claimed in claim 1 in which means are provided on at least an arm of each bracket member on the same level, providing support for relatively small diameter pot covers.

3. A structure as claimed in claim 2 in which said last means comprise a flange arranged horizontally and extending toward the opposed bracket member.

4. A structure as claimed in claim 1 in which said plate member and each of said bracket members are provided with vertically arranged slots and tubular hinge means are engaged in said slots along joined edges of said members whereby to provide said hinged connections.

5. A rack for supporting inverted pot covers which comprises a generally rectangular plate member having a pair of bracket members hingedly secured to opposite edges thereof and each swingable between a first position arranged at an angle relative to said plate member and a second position overlying the plate member in collapsed condition, each of said bracket members having at least one arm for supporting said pot cover upon the arms when both are in said first position, and means extending between the arms for removably holding the arms in said first position, said members cooperable to support said rack vertically oriented on a horizontal support surface in said first position, each of the said bracket members being of substantially U-shaped configuration albeit lying on its side, thereby providing a pair of arms on each of the said bracket members with the arms vertically spaced so that in the said first position juxtaposed pair of said arms may support a pair of said pot covers between them respectively.

References Cited in the file of this patent

UNITED STATES PATENTS

| | | |
|---|---|---|
| 460,748 | Hartmann | Oct. 6, 1891 |
| 915,618 | Mattison | Mar. 16, 1909 |
| 2,135,093 | Abrams | Nov. 1, 1938 |
| 2,936,900 | Wax | May 17, 1960 |

FOREIGN PATENTS

| | | |
|---|---|---|
| 340,490 | Great Britain | Dec. 29, 1930 |